Feb. 24, 1948.  J. F. BOGEN  2,436,417
INCLINOMETER
Filed June 29, 1944
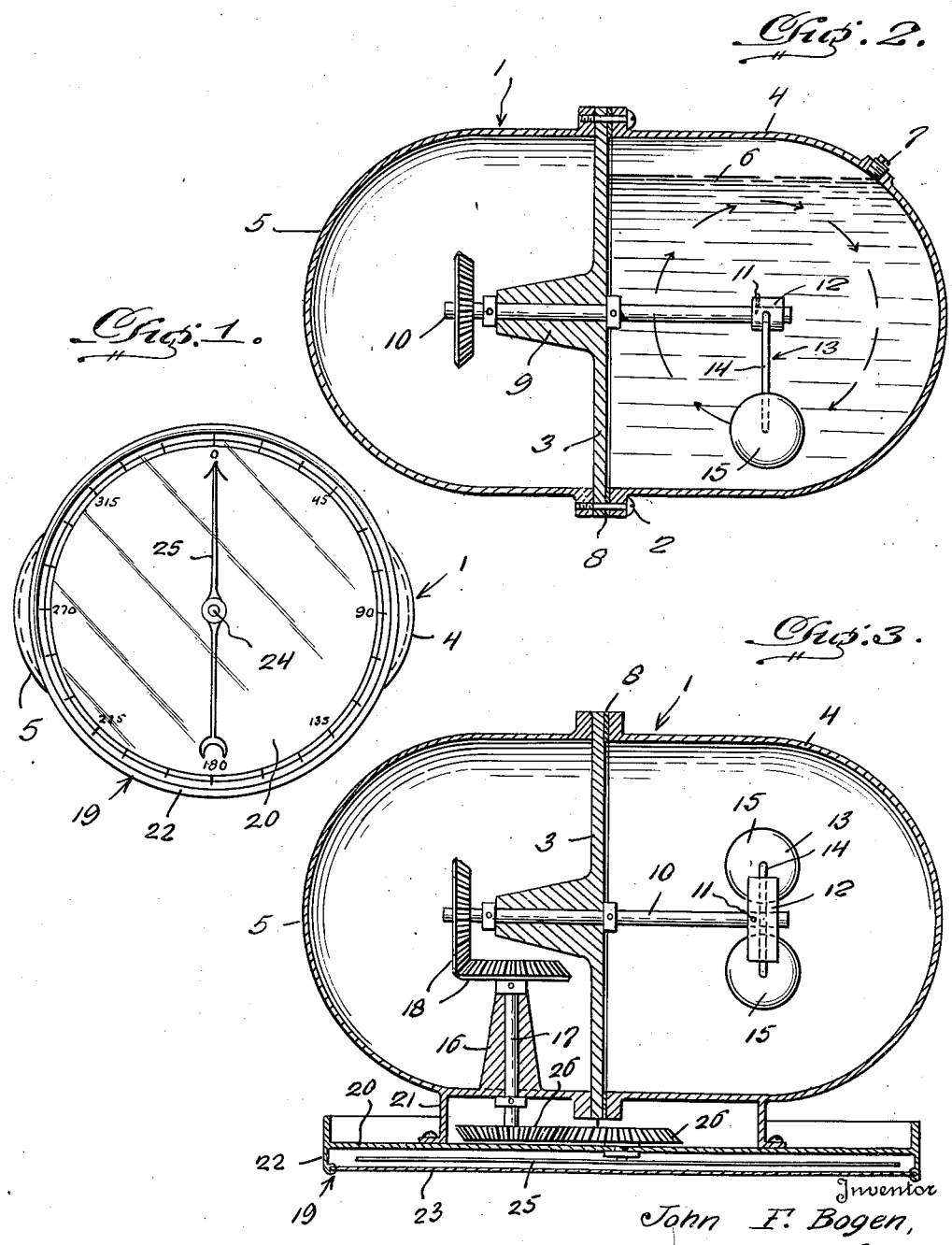
Inventor
John F. Bogen,
Attorneys Patented Feb. 24, 1948

2,436,417

UNITED STATES PATENT OFFICE 2,436,417

INCLINOMETER

John F. Bogen, San Diego, Calif.

Application June 29, 1944, Serial No. 542,724

2 Claims. (Cl. 33—215)

1

The present invention relates to new and useful improvements in inclinometers of the pendulum type for use particularly on aircraft although it will be understood, of course, that the device may be used for any other purpose for which it may be found adapted.

An important object of the invention is to provide an inclinometer of the aforementioned character comprising a unique construction and arrangement of pendulum for actuating the indicator.

Another important object of the invention is to provide an inclinometer of the character described wherein undesirable oscillation of the pendulum will be prevented.

Other objects of the invention are to provide an inclinometer which will be comparatively simple in construction, strong, durable, highly efficient and reliable in use, compact and which may be manufactured at low cost.

All of the foregoing and still further objects and advantages of the invention will become apparent from a study of the following specification, taken in connection with the accompanying drawing wherein like characters of reference designate corresponding parts throughout the several views, and wherein:

Figure 1 is a view in front elevation of an inclinometer constructed in accordance with the present invention.

Figure 2 is a vertical sectional view through the device.

Figure 3 is a horizontal sectional view.

Referring now to the drawing in detail, it will be seen that the embodiment of the invention which has been illustrated comprises a substantially oval housing which is designated generally by the reference character 1. The housing 1 includes complemental sections which are bolted together at 2 with a partition 3 therebetween in a manner to provide chambers 4 and 5, the former for the reception of oil, as at 6. A removable plug 7 is provided in the chamber 4 to facilitate filling said chamber to the desired level with oil. A gasket 8 between the partition 3 and the chamber 4 prevents leakage of the oil.

Journaled in a suitable bearing 9 which is provided therefor on the partition 3 is a horizontal shaft 10. The end portions of the shaft 10 project into the chambers 4 and 5. Secured by a pin 11 on the end portion of the shaft 10 which projects into the chamber 4 is a transverse bearing 12. A pendulum 13 is mounted in the bearing 12. Pendulum 13 includes a substantially U-shaped shaft 14 having an intermediate portion

2 journaled in the bearing 12. The end portions or arms of the shaft 14 have fixed thereon weights 15.

Journaled in a bearing 16 which is provided therefor in the chamber 5 is a shaft 17 which extends at right angles to the shaft 10. The shaft 10 drives the shaft 17 through beveled gears 18 in the chamber 5.

Mounted vertically on the front of the housing 1 is an indicator 19. The indicator 19 comprises a dial 20 which is fixed at 21 to the housing 1. The dial 20 is provided with a peripheral rim 22 having mounted in the front portion thereof a lens 23.

The indicator 19 further includes a shaft 24 which is journaled centrally in the dial 20. A pointer 25 is fixed on the forward end of the shaft 24 and is cooperable with the dial 20. The shaft 17 drives the shaft 24 through gears 26.

It is thought that the operation of the instrument will be readily apparent from a consideration of the foregoing. Briefly, when the plane is in level flight the pointer 25 is maintained at zero on the dial 20 by the pendulum 13. However, if the plane noses upwardly or downwardly, the pendulum 13 swings laterally by gravity in the chamber 4 for actuating the pointer 25 through the shaft 10, the gears 18, the shaft 17, the gears 26 and the shaft 24. The construction and arrangement of the pendulum 13 is such that it is permitted to swing longitudinally with respect to the shaft 10. Thus, the pendulum 13 will remain at its lowest point at all times. It will accordingly be seen that the pendulum 13 will function to operate the pointer 25 properly regardless of whether the plane banks to the right or to the left. The oil 6 in the chamber 4 retains the pendulum 13 against idle or undesirable swinging movement.

It is believed that the many advantages of an inclinometer constructed in accordance with the present invention will be readily understood and although a preferred embodiment of the instrument is as illustrated and described, it is to be understood that changes and the details of construction may be resorted to which will fall within the scope of the invention as claimed.

What is claimed is:

1. An inclinometer comprising a housing including a pair of complemental sections, a partition between said sections providing a pair of chambers, a shaft journaled in the partition and projecting into the chambers, a shaft journaled in one of the chambers at right angles to the first named shaft, gears operatively connecting said first named shaft to said second named shaft, an indicator mounted on the housing, said indicator including a dial, a shaft journaled in said dial, a pointer fixed on the third named shaft and cooperable with the dial, gears operatively connecting the second named shaft to the third named shaft, and gravity operated means on the first named shaft in the other chamber for actuating said first named shaft, said means including a bearing fixed transversely on the first named shaft, a substantially U-shaped shaft having an intermediate portion journaled in the bearing, and weights on the end portions of said substantially U-shaped shaft.

2. An inclinometer comprising a housing including complemental sections, a partition between said sections providing a pair of chambers, an indicator mounted on the housing, a shaft journaled in the partition, means in one of the chambers operatively connecting said shaft to the indicator, a bearing mounted transversely on the shaft in the other chamber, a substantially U-shaped shaft having its intermediate portion journaled in said bearing, weights on the end portions of said substantially U-shaped shaft for actuating the first named shaft by gravity, and a fluid in said other chamber for preventing idle swinging movement of the weights.

JOHN F. BOGEN.

REFERENCES CITED

The following references are of record in the file of this patent:

UNITED STATES PATENTS

| Number | Name | Date |
| --- | --- | --- |
| 1,055,902 | Griffiths | Mar. 11, 1913 |
| 1,266,551 | Carstensen | May 21, 1918 |
| 1,312,303 | Berry | Aug. 5, 1919 |
| 1,437,164 | Bachila | Nov. 28, 1922 |
| 1,477,545 | Day | Dec. 18, 1923 |

FOREIGN PATENTS

| Number | Country | Date |
| --- | --- | --- |
| 567,786 | Germany | 1933 |